Aug. 26, 1952 — L. R. GRUSS — 2,608,404
LANDING STRUT OR THE LIKE
Filed Sept. 7, 1946 — 2 SHEETS—SHEET 2

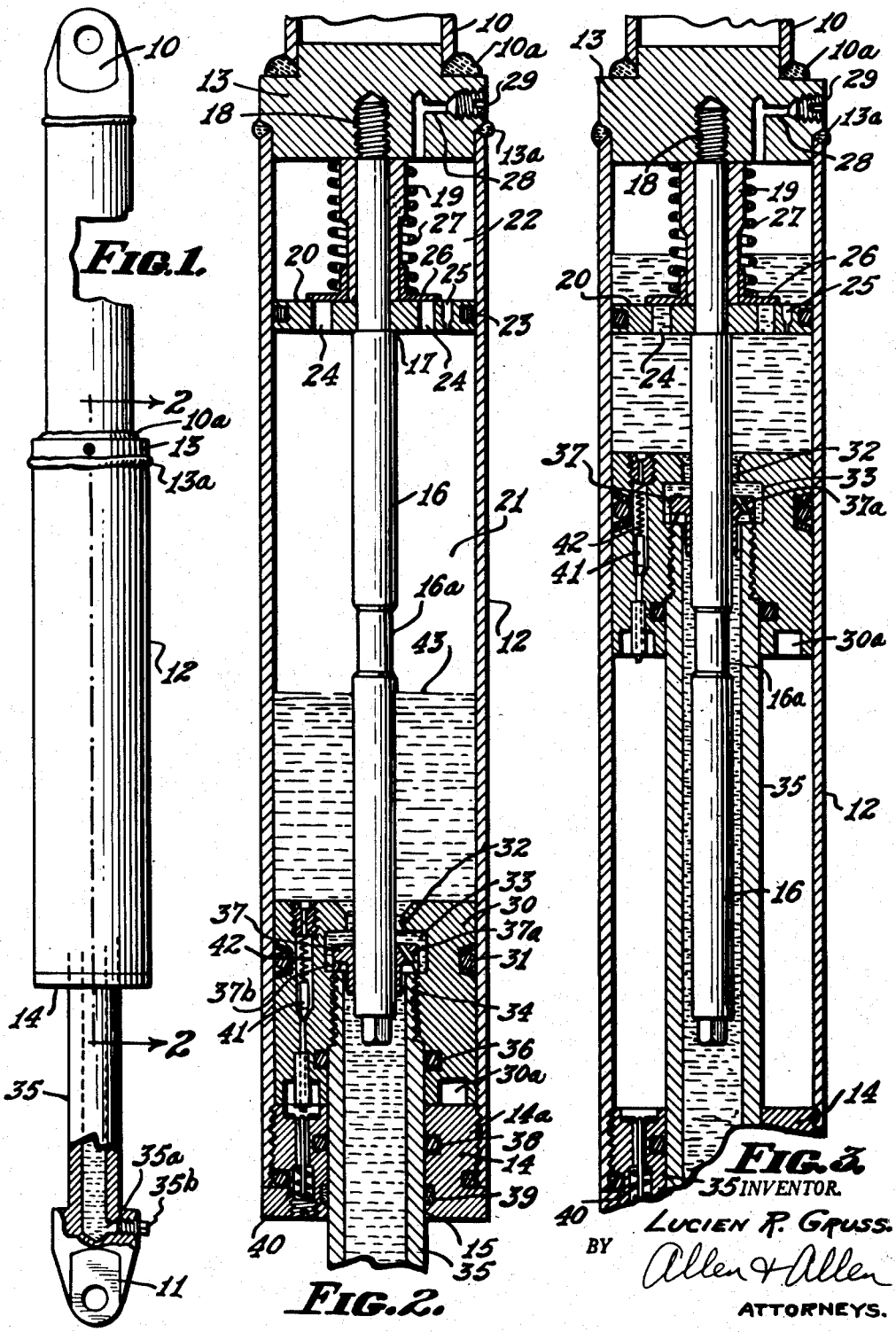

INVENTOR.
LUCIEN R. GRUSS
Allen & Allen
ATTORNEYS.

Patented Aug. 26, 1952

2,608,404

UNITED STATES PATENT OFFICE 2,608,404

LANDING STRUT OR THE LIKE

Lucien R. Gruss, Middletown, Ohio

Application September 7, 1946, Serial No. 695,470

10 Claims. (Cl. 267—64)

This invention relates to a landing strut or the like and in particular to a landing strut for use on airplanes to absorb the shock of landing, and the minor shocks incidental to taxiing.

While I shall describe the invention in its application to the landing gear of aircraft, it will be understood that it has utility in other fields.

Struts for airplanes are mounted in diverse manners in different types of aircraft. In some instances the strut forms the connection between the landing wheel and the wing or fuselage of the aircraft, while in other installations the strut forms a part of a linkage so that the strut may be either in a vertical position or in any angular position. Furthermore, in some installations, the strut must take a compressive load, while in other installations it must take a tensile load.

It is therefore an object of my invention to provide a novel strut which with only slight modification may operate in a compressive capacity or in a tensile capacity, the principles of operation being the same in both installations or modifications.

It is another object of my invention to provide a hydropneumatic strut which is substantially oil-tight, so that it need not be recharged from time to time, and which will automatically recharge itself with air in use after air pressure within the strut becomes too low. It is a still further object of my invention to provide a strut as outlined above which cannot overcharge itself with air.

In general the objects of my invention include the provision of a strut which is relatively simple in construction and which is substantially maintenance free and thoroughly reliable. These and other objects of my invention, which will be pointed out in greater detail hereinafter or which will be apparent to one skilled in the art upon reading these specifications, I accomplish by that certain construction and arrangement of parts of which I shall now describe some exemplary embodiments.

Reference is made to the drawings forming a part hereof and in which Figure 1 is an elevational view of a strut according to my invention with parts in section.

Figure 2 is a cross-sectional view on an enlarged scale taken on the line 2—2 of Figure 1, showing the strut in extended condition.

Figure 3 is a fragmentary cross-sectional view similar to Figure 2, but showing the strut in a highly compressed condition.

Figure 4:
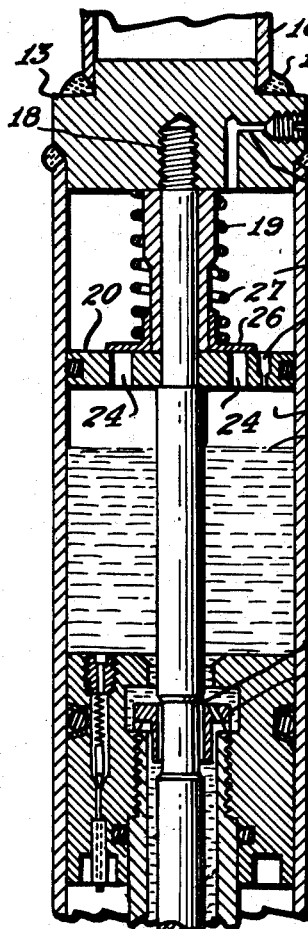
Figure 4 is a fragmentary cross-sectional view similar to Figures 2 and 3, but showing the strut in static or taxiing condition.

Briefly, in the practice of my invention, I provide a cylinder closed at one end having a partition wall spaced from said end; said partition wall has an aperture therein and valve means, as will be described hereinafter. A ram is securely fastened to said head and extends into a cylinder formed in a piston riding in said first named cylinder. Said cylinder passes out through a head in the other end of said first cylinder, which is provided with an aperture for this purpose. In both the compression and tension type of strut, the general principles of operation are the same, but the points of attachment are different.

Referring now in more detail to Figure 1, a strut is shown having an element 10 for attachment, for example, to the fuselage of an airplane and a portion 11 for attachment to a landing wheel. The main cylinder is indicated at 12 and is provided with a head 13, securely fastened thereto as by welding at 13a. The head 13 is fastened to the member 10 as by welding at 10a. The other end of the cylinder 12 is provided with a head 14 threaded into the cylinder 12 and having an aperture 15 for a purpose to be described hereinafter.

A ram, generally indicated at 16 and having a shoulder 17 and a necked portion 16a, is threaded into the head, as at 18. A spacer member 19 is held in position between the head 13 and a partition member 20 against which the shoulder 17 bears. The cylinder 12 is therefore spaced into a large compartment 21 and a smaller compartment 22. The partition member 20 is provided with sealing means 23 and a series of apertures 24 as well as a small bleed port. The apertures 24 are normally closed by means of a valve member 26, which is forced against the partition member 20 by means of the spring 27. A filling gage port 28 in the head 13 is closed by means of a screw plug 29. Arranged to reciprocate in the chamber 21 is the piston 30, which is provided with means 31 to provide a seal between the periphery of the piston 30 and the cylinder 12. The piston 30 is provided with a central aperture 32 for the passage of the ram 16. The aperture 32 opens into a valve chamber 33 and a threaded opening 34. The member 35, which may be considered as a rod for the piston 30 or as a ram chamber to receive the ram 16, is threaded into the aperture 34. Seal means 36 provide a seal between the piston and the ram chamber.

As will be clear from Figure 2, the ram 16 is smaller than the ram chamber 35, and a valve member 37 is guided between the ram 16 and the ram chamber 35, and is adapted to slide upward under certain conditions. The valve member 37 is provided with feet 37b to prevent its closing upon movement to the position shown in Figure 2, and a small port 37a is provided therethrough.

As mentioned above, the cylinder 12 is closed by a head 14 which is threaded into the member 12 as at 14a, and it has the aperture 15 to receive the ram chamber 35 and is provided with sealing means 38 and 39 therebetween. The piston 30 is provided with the annular groove 30a, which will be described in more detail hereinafter.

For the purpose of charging the system with oil or other suitable fluid, a valve 40 is provided in the head 14, and this valve may be a Schrader valve. It is similar in appearance and function to an automobile tire valve. A check valve 41 is provided in a port 42 passing through the head 30. When it is desired to charge the system with oil, oil is forced in through the valve 40 and passes through the port 42, past the check valve 41, into the chamber 21. The screw plug 29 is removed and the strut is compressed to a predetermined position and oil is forced in until it runs out through the port 28. At this point the screw plug 29 is screwed back in place and the system is properly charged. The level of the oil or other hydraulic fluid is indicated at 43.

The ram chamber 35 may be charged through the aperture 35a by removing the screw plug 35b.

In Figure 2 the strut is shown in its extended position, i. e. with no load upon it. The operation of the device is as follows: When a shock is encountered which would tend to make the elements 10 and 11 approach each other, the ram 16 plunges into the ram chamber 25 which is filled with oil. This causes the valve member 37 to shift upwardly in the figure, closing the aperture 32, except for the port 37a, and the oil from the chamber 35 is thus gradually forced through the port 37a, and the aperture 32 into the chamber 21. The initial shock is absorbed, however, by compression of the oil in the chamber 35; and flow of oil through the port 37a immediately reduces the pressure in the chamber 35, thus damping any recoil tendency.

At the same time the assembly, including the ram chamber 35 and the piston 30, are moving upwardly forcing the air and oil in the chamber 21 through the apertures 24 into the chamber 22 against the pressure of the spring 27. Oil in the chamber 22 momentarily floods and blocks the bleed port 25, thus damping the recoil. This situation of full compression is shown in Figure 3. Then the oil escapes back into the chamber 21 through the bleed port 25; in this manner the shock of landing is absorbed, and objectionable bounce or recoil is eliminated.

When the aircraft is resting on the ground, and the strut is supporting the normal weight of the aircraft, the parts will occupy the position shown in Figure 4. It will be noted that the portion of the ram of reduced diameter 16a is within the sleeve of the valve 37. Thus during taxiing, minor shocks producing minor movements of the ram 16 relative to the ram chamber 35 will not cause the valve 37 to function because the oil can flow freely back and forth between the chamber 35 and the cylinder 21 around said reduced portion 16a of the ram. Therefore, the normally minor shocks encountered in taxiing are absorbed simply by compression of the air into the cylinder 22 and its gradual return to the cylinder 21 through the port 25. If a heavy shock is encountered, the reduced diameter 16a will pass the valve 37, whereupon the system functions as it did in absorbing the heavy shock of landing.

When the load is taken off the strut, the parts can return to the position of Figure 2 under the influence of their own weight, since the valve 37 is prevented from closing completely by the feet 37b, so that there is no resistance to return flows of oil.

It will be seen that as a result of rapid minor shocks, such as those incident to taxiing, there will be a tendency for the piston 30 to draw air into the chamber 21 through the valve 40, and incident to the parts returning to the position of Figure 2, this air would be pumped through the valve 41 to the upper side of the piston 30. In order to prevent an excess of air being pumped into the chamber 21, there is provided the groove 30a, mentioned above and when the pressure on the upper side of the piston 30 is equal to the pressure in the annular chamber 30a, no more air will be pumped through the valve 41. It will thus be seen that the system in use continuously tends to recharge itself with air to keep the air pressure at the desired level, but by virtue of the chamber 30a, this air pressure will not be built up beyond a desired and predetermined figure.

Figure 6:
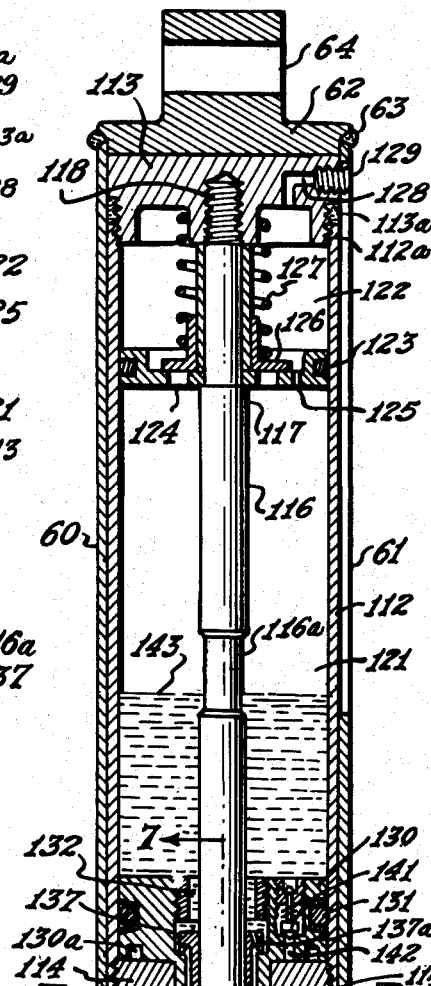
Figure 6 is a cross-sectional view taken on the line 6—6 of Figure 5 on an enlarged scale, showing the strut in extended condition.
Figure 7:
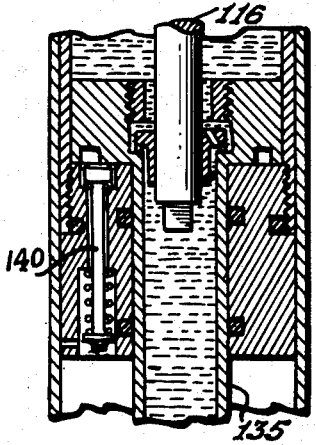
Figure 7 is a fragmentary cross-sectional view taken on the line 7—7 of Figure 6.
Figure 5:
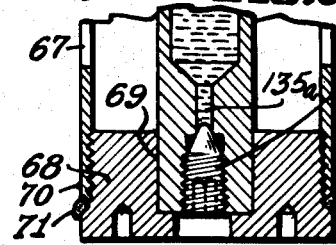
Figure 5 is an elevational view of another form of strut according to my invention.

The device of Figures 5 to 7 inclusive is very similar to the device heretofore described, except that in the device of Figures 5 to 7, tensile stresses rather than compressive stresses are absorbed.

As shown in Figure 6, the cylinder 112 corresponds to the cylinder 12 of Figure 2, and the head 113 corresponds to the head 13. As before, the head 113 is provided with a port 128 which can be closed by a screw plug 129, and the cylinder 112 is preferably screw threaded to the head 113, as at 112a, and welded, as at 113a. Again there is provided the partition element 120 having the apertures 124 and the bleed port 125. The numerals referring to various parts in Figure 6 which correspond to parts in Figure 2 have been given the same numerals, but increased by one hundred (e. g. the ram 116 corresponds to the ram 16).

In the device of Figures 5 to 7, the cylinder 112 rides in an outer cylinder 60 which is provided with a slot 61 to provide clearance for the screw plug 129. The cylinder 60 is provided with a head 62 which is welded thereto at 63 and one of the connections to the strut is made by means of the lug 64. The other connection to the strut is made by means of the trunnions 65, which are seated in recesses 66 in the cylinder head 114, which is threaded into the end of the cylinder 112, at at 114a. The head 114 is provided with the aperture 115 to permit passage of the ram chamber 135 as before and is provided with the sealing means 138 and also with the sealing means 138a.

As before, a piston 130 rides in the cylinder 112, but in the present instance the piston is integral with the ram chamber 135, and here again the various parts have the same numerals as those in Figure 2 increased by one hundred.

It will be noted that the outer cylinder 60 is provided with the slots 67 to take care of the travel of the trunnions 65. It will be clear from the foregoing description that the device in Figures 5 to 7 is the same as the device of Figures 1 to 4, except that in the device of Figures 5 to 7 the tension forces are applied to the trunnions 65 and the lug 64, whereby the effect is the same as if compression were being applied between the head 113 and the right-hand end of the cylinder 61.

The right-hand end of the cylinder 61 is closed by a cap 68, which has a recess 69 to accept the end of the ram chamber 135. The cap member 68 is preferably threaded into tube 61 as at 70 and sealed as at 71.

It will be seen that "bottoming" or metal-to-metal contact under compression is impossible in my novel strut because of the tremendously rapid building up of air pressure because of the small air volume.

While I have described two preferred embodiments of my invention, it will be clear that numerous modifications may be made in the same without departing from the spirit of my invention, and I do not therefore intend to limit myself except as pointed out in the claims which follow.

Having now fully described my invention, what I claim as new and desire to secure by Letters Patent is:

1. A device of the character described comprising a main cylinder having a head and a ram fixed thereto and axially disposed with respect to said cylinder, a partition for said cylinder supported by said ram and dividing said cylinder into a large compartment and a smaller compartment, an apertured head member on the end of said cylinder opposite said head, a piston in said cylinder having an aperture therethrough for passage of said ram, and a cylinder for said ram fixed to said piston and passing through the aperture in said head member, said ram being of a length to extend into said ram cylinder when said piston is in its extreme position adjacent said apertured head, hydraulic fluid in said ram cylinder, hydraulic fluid and air in said large compartment and air in said smaller compartment, and means on said partition for controlling the flow of fluid between said large compartment and said smaller compartment and means associated with said piston for controlling the flow of hydraulic fluid between said main cylinder and said ram cylinder.

2. A device according to claim 1, in which said first mentioned means comprises an aperture through said partition, one-way valve means normally urged against said partition to cover said aperture but yieldable to permit flow of fluid from said large compartment into said smaller compartment, and a bleed port to permit gradual flow of fluid from said smaller compartment back into said large compartment.

3. A device according to claim 1, in which said second mentioned means comprises a recess in said piston and a sleeve snugly embracing said ram, and having a flange disposed in said recess, said flange having a bleed port, and having means to prevent its closing upon relief of pressure within said ram cylinder.

4. A device according to claim 1, in which said main cylinder is fixed to one element, and said ram cylinder is fixed to another element, said device serving to absorb compressive forces between said elements.

5. A device according to claim 1, in which said main cylinder is slidable in a sleeve, and in which said main cylinder is fixed to one element and said sleeve is fixed to another element, said device serving to absorb tensile forces between said elements.

6. A device according to claim 1, in which said piston is provided with a valve for permitting air to be pumped into said main cylinder by said piston, and in which said piston is provided with a pneumatic chamber for preventing a predetermined air pressure within said cylinder from being exceeded, and in which said apertured head member is provided with a check valve to permit air to be drawn into said pneumatic chamber.

7. A device according to claim 1, in which said head member is provided with a one-way valve to permit air to be pumped into said main cylinder by said piston, in which said piston is provided with a one-way valve to permit the passage of air from the head member side to the head side thereof, and in which means are provided to prevent an excess of air from being pumped into said cylinder.

8. A device according to claim 1, in which said head member is provided with a one-way valve to permit air to be pumped into said main cylinder by said piston, in which said piston is provided with a one-way valve to permit the passage of air from the head member side to the head side thereof, and in which said piston, on its member side, is provided with a recess, whereby when the pressure of the air trapped in said recess upon movement of said piston against said head member is exceeded by the pressure on the head side of said piston, no further air can be pumped into said cylinder.

9. A device of the character described, comprising a main cylinder having a head and a ram fixed thereto and axially disposed in said cylinder, a partition for said cylinder supported by said ram and dividing said cylinder into a large compartment and a smaller compartment, an apertured head member on the end of said cylinder opposite said head, a piston in said cylinder having an aperture therethrough for passage of said ram, and a cylinder for said ram fixed to said piston and passing through the aperture in said head member, a liquid in said ram chamber, a liquid and a gas in said large compartment and a gas in said smaller compartment, means for controlling the passage of said gas and liquid between said large and smaller compartments, a valve having an aperture for snug passage of said ram, disposed between said ram chamber and said large compartment, and by-pass means on said ram rendering said valve inoperative during minor movement of said ram to permit free flow of liquid between said ram chamber and said large compartment, and operative in response to major movement of said ram to render said valve operative.

10. A device of the character described, comprising a main cylinder having a head and a ram fixed thereto and axially disposed in said cylinder, a partition for said cylinder supported by said ram and dividing said cylinder into a large compartment and a smaller compartment, an apertured head member on the end of said cylinder opposite said head, a piston in said cylinder having an aperture therethrough for passage of said ram, and a cylinder for said ram fixed to said piston and passing through the aperture in said head member, a liquid in said ram chamber, a liquid and a gas in said large compartment and a gas in said smaller compartment, valve means for controlling the passage of said gas and liquid between said large and smaller compartments, an annular valve chamber in said piston having an annular opening about said ram, an annular valve in said chamber having a bleed port therein, and bypass means on said ram for preventing the closing of said annular valve in the direction of said ram chamber, whereby when said valve is operative, liquid flowing from said ram chamber into said large compartment under pressure of said ram must flow through said bleed port while liquid flowing from said large compartment into said ram chamber upon relief of said pressure may flow substantially without restriction, and a portion of reduced diameter on said ram so disposed that when said device is in a static condition, said reduced diameter is in operative relation with said annular valve to render the same inoperative so as to permit free flow of liquid back and forth between said ram chamber and said large compartment upon minor movement of said ram.

LUCIEN R. GRUSS.

REFERENCES CITED

The following references are of record in the file of this patent:

UNITED STATES PATENTS

| Number | Name | Date |
|---|---|---|
| 1,549,367 | Lancia | Aug. 11, 1925 |
| 1,727,121 | Haines | Sept. 3, 1929 |
| 2,004,380 | Nickelsen | June 11, 1935 |
| 2,156,117 | Johnson | Apr. 25, 1939 |
| 2,378,712 | Laraque | June 19, 1945 |
| 2,379,388 | Thornhill | June 26, 1945 |
| 2,443,587 | Tack | June 15, 1948 |
| 2,443,616 | Gruss | June 22, 1948 |

FOREIGN PATENTS

| Number | Country | Date |
|---|---|---|
| 242,292 | Great Britain | July 19, 1928 |